United States Patent
Lee

(10) Patent No.: US 6,952,922 B2
(45) Date of Patent: Oct. 11, 2005

(54) CHOKE VALVE OF CLUTCH RELEASE CYLINDER

(75) Inventor: Jeong-Kyu Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 75 days.

(21) Appl. No.: 10/749,251

(22) Filed: Dec. 30, 2003

(65) Prior Publication Data

US 2005/0081709 A1 Apr. 21, 2005

(30) Foreign Application Priority Data

Oct. 21, 2003 (KR) .............................. 10-2003-0073397

(51) Int. Cl.⁷ ................................................ F15B 7/06
(52) U.S. Cl. ............................ 60/591; 91/443; 92/163; 137/513.7
(58) Field of Search ............................... 60/591; 91/31, 91/443; 92/163, 164; 137/513.7; 192/109 F; 285/125.1; 303/887

(56) References Cited

U.S. PATENT DOCUMENTS

| 787,967 A | * | 4/1905 | Wilson | ........................ 91/443 |
| 5,305,794 A | * | 4/1994 | George | .................... 137/513.7 |
| 6,564,918 B2 | * | 5/2003 | Itoh | ........................ 192/109 F |

FOREIGN PATENT DOCUMENTS

JP    2002-13551    1/2002

* cited by examiner

Primary Examiner—F. Daniel Lopez
(74) Attorney, Agent, or Firm—Morgan Lewis & Bockius LLP

(57) ABSTRACT

A choke valve of the clutch release cylinder wherein the actuating oil is slowly discharged when the clutch pedal is released, and when the clutch pedal is depressed, resistance to the actuating oil is minimized for the actuating oil to be swiftly and smoothly supplied to the clutch release cylinder, thereby improving the responsiveness of the clutch and preventing occurrences of noise and vibration when the clutch is in operation.

3 Claims, 5 Drawing Sheets

CHOKE VALVE OF CLUTCH RELEASE CYLINDER

CROSS-REFERENCE TO RELATED APPLICATIONS

This application claims priority of Korean Application No. 10-2003-0073397, filed on Oct. 21, 2003, the disclosure of which is incorporated fully herein by reference.

FIELD OF THE INVENTION

The present invention relates to a clutch release cylinder for actuating the clutch of a vehicle via hydraulic pressure and, more particularly, to a choke valve of the clutch release cylinder for adjusting the flow of actuating oil flowing in the clutch release cylinder when the clutch pedal is depressed and released.

BACKGROUND OF THE INVENTION

A choke valve of a clutch release cylinder serves to prevent a sudden discharge of actuating oil when the clutch pedal is released to enable a smooth power connection of the clutch.

When the clutch pedal is depressed, resistance of the choke valve in relation to the actuating oil flow is preferably small so that the actuating oil can be smoothly and swiftly supplied into the clutch release cylinder, while minimizing vibration and noise. When the actuating oil is discharged, the choke valve should function properly for the actuating oil to be slowly returned.

SUMMARY OF THE INVENTION

The present invention provides a choke valve of a clutch release cylinder adapted to allow actuating oil to be discharged slowly when a clutch pedal is released, and when the clutch pedal is depressed, resistance to the actuating oil is minimized to allow the actuating oil to be supplied to the clutch release cylinder smoothly and quickly to improve the responsiveness of the clutch and prevent the generation of noise and vibration.

In accordance with a preferred embodiment of the present invention, the choke valve of the clutch release cylinder is connected to a hose for supplying actuating oil to the clutch release cylinder. The hose is formed along the circumferential surface thereof with a return groove for enabling the actuating oil to flow to the clutch release cylinder and formed with a return hole for communicating the return groove with the inside of the hose. A ball is resiliently supported by a return spring at a distal end of the hose. A main hole is formed at a wall of the clutch release cylinder to block communication with the hose by the ball abutted to the distal end of the hose. The wall of the clutch release cylinder is formed with a cylinder hole having a smaller diameter than that of the main hole so as to communicate with the return groove of the hose.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENT

The preferred embodiment of the present invention will now be described in detail with reference to the annexed drawings, where the present embodiment does not limit the scope of the present invention but is given only as an illustrative purpose.

Figure 1:
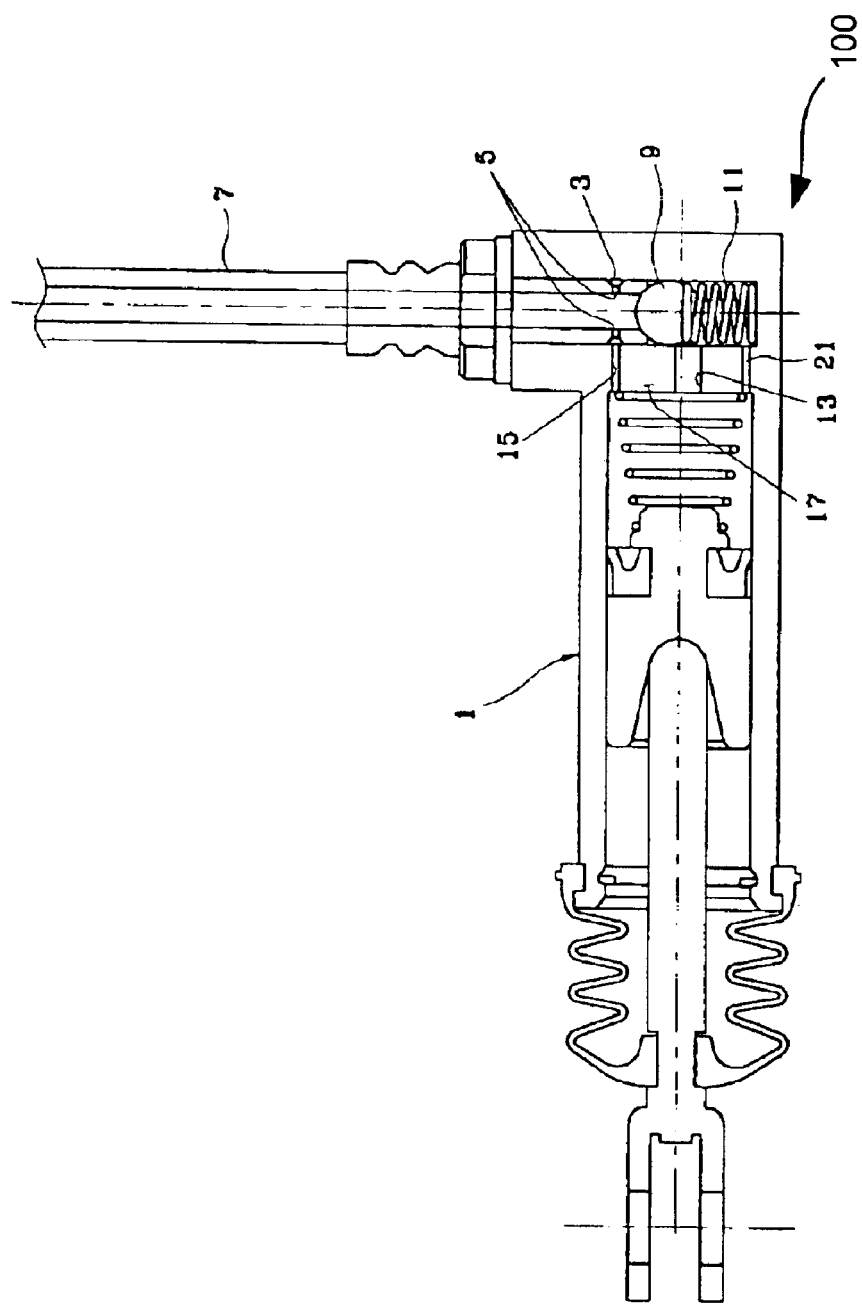
FIG. 1 is a schematic drawing for illustrating a structure of a choke valve of a clutch release cylinder according to an embodiment of the present invention.

As shown in FIG. 1, a choke valve 100 of a clutch release cylinder comprises a hose 7 for supplying actuating oil to the clutch release cylinder 1. The hose 7 is formed as a circumferential surface thereof with a return groove 3 for enabling the actuating oil to flow and formed with a hose return hole 5 for communicating with the return groove 3 and with the inside of the clutch release cylinder 1. A ball 9 is disposed toward a distal end of the hose 7, and a return spring 11 resiliently supports the ball 9 at the distal end of the hose 7. A main hole 13 is formed to block communication with the hose 7 by the ball 9 abutted at the distal end of the hose 7. A wall 17 of the clutch release cylinder 1 is formed with a cylinder return hole 15 having a smaller diameter than that of the main hole 13 for communicating with the return groove 3 of the hose 7.

The choke valve 100 is constructed such that the hose 7 is inserted at the clutch release cylinder 1 to be fixed thereto, and a space is formed at a distal end of the hose 7 for the ball 9 to be resiliently supported by the return spring 11 as shown in the drawing.

Figure 5:
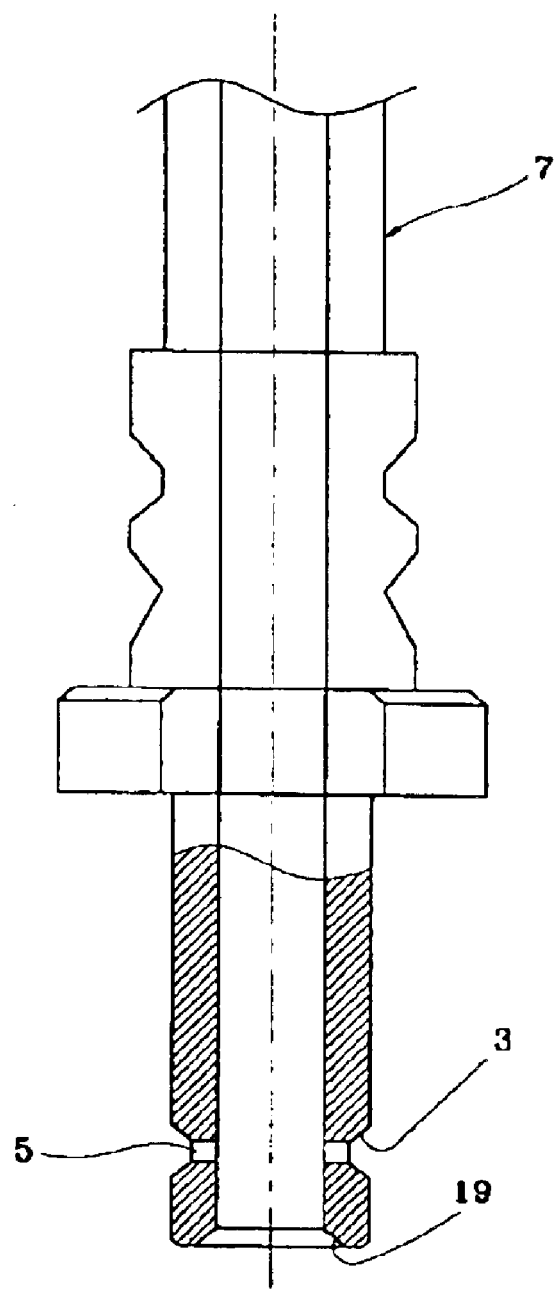
FIG. 5 is a schematic drawing for illustrating a detailed shape of a hose in FIG. 1.

As depicted in FIG. 5, the distal end of the hose 7 is formed with a spherical surface 19 for the ball 9 to be tightly abutted thereto for a natural seal. The return groove 3 of the hose 7 is so formed as to communicate with the cylinder return hole 15 when the hose 7 is fixedly inserted into an accurate position of the clutch release cylinder 1, and the diameter thereof is smaller than that of the main hole 13. The speed of the actuating oil being discharged from the clutch release cylinder 1 depends on the diameter size when the accelerator pedal is released by the driver. Thus, it is preferable that an appropriate diameter be formed for smooth operation, to avoid the generation of shock when the clutch transmits power.

Meanwhile, the main hole 13 is relatively large when compared to the cylinder return hole 15. Because the size of the main hole 13 depends on the speed of the actuating oil being supplied to the clutch release cylinder 1 when the clutch pedal is depressed, the main hole 13 should be preferably large enough to promote a quick supply of the actuating oil, which results in the subsequent smooth operation of the clutch.

The wall 17 of the clutch release cylinder 1 is further formed with a pressure adjusting hole 21 that communicates with a space formed at the return spring side about the ball 9. When the clutch pedal is depressed to allow the ball 9 to press and move the return spring 11, the pressure adjusting hole 21 serves to remove the pressure in the space into which the ball 9 has moved and been inserted, and simultaneously maintain the pressure in the space of the return spring 11 side of the ball 9 as the inner pressure of the clutch release cylinder 1 when the clutch pedal is depressed to increase the inner pressure of the clutch release cylinder 1 such that when the clutch pedal is released, the ball 9 is moved to block direct communication between the main hole 13 and the hose 7.

Next, the operation of an embodiment of the present invention as constructed above will be described.

Figure 2:
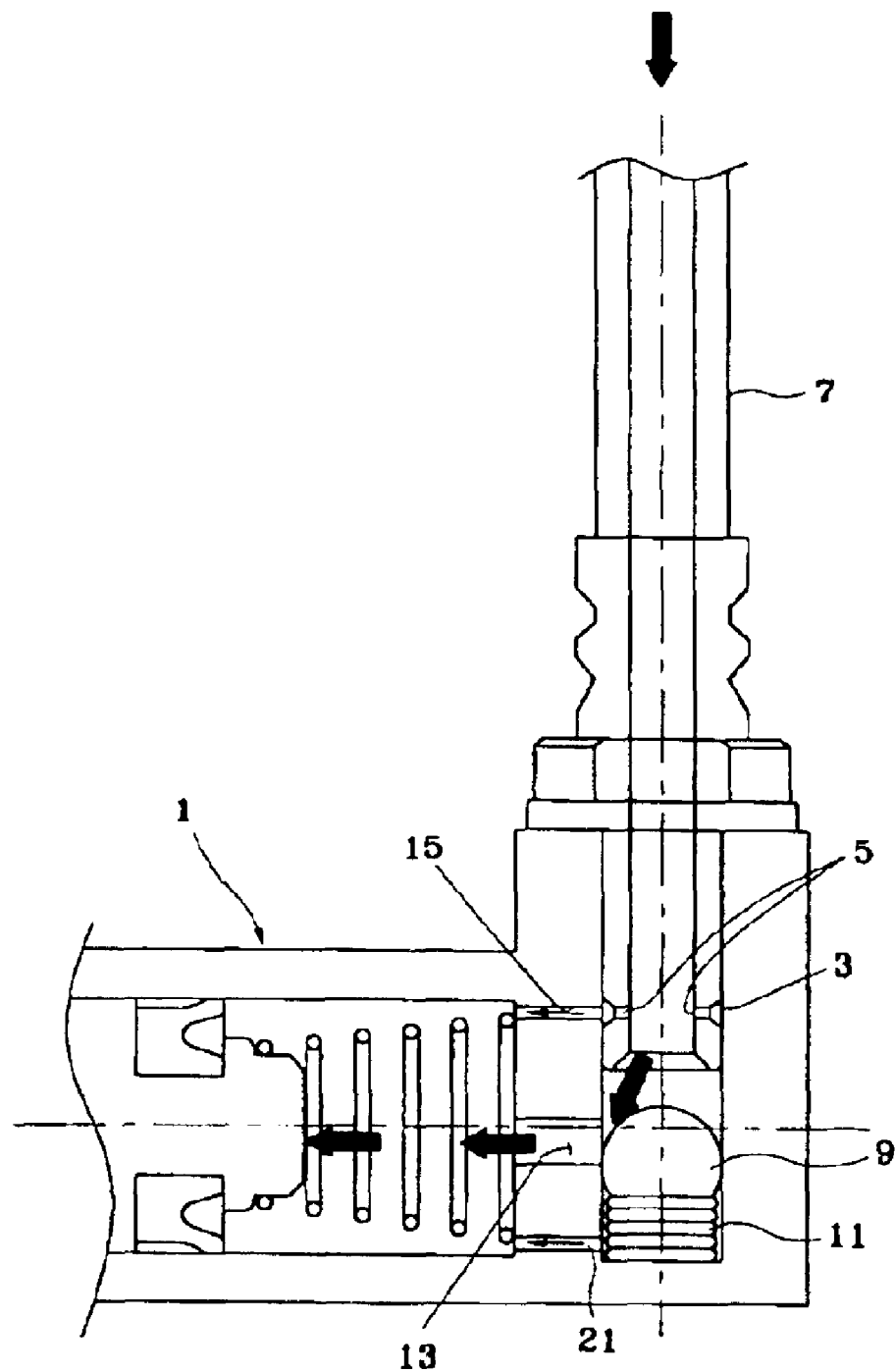
FIG. 2 is a schematic drawing for illustrating an operation of a choke valve when a clutch pedal is depressed.

As shown in FIG. 2, when the clutch pedal is depressed, hydraulic oil pressure generated by the clutch master cylinder is provided to the clutch release cylinder 1 via the hose 7. When the hydraulic oil pressure of the actuating oil is applied, the ball 9 presses on the return spring 11 and moves to allow the main hole 13 to communicate with the hose 7.

Although the pressure of the actuating oil is supplied into the clutch release cylinder 1 via the hose return hole 5, the return groove 3 and the cylinder return hole 15, most of the hydraulic pressure is used to move the ball 9 because the diameter of the clutch release cylinder 1 is comparatively smaller than that of the ball 9, such that after the ball 9 has been swiftly moved, most of the actuating oil is supplied into the clutch release cylinder 1 via the main hole 13.

As a result, when the clutch pedal is depressed, the actuating oil is swiftly and smoothly supplied into the clutch release cylinder 1 via the main hole 13, thus quickening the operating responsiveness of the clutch. Only a line contact is effected between the ball 4 and the clutch release cylinder 1 when the ball 9 is moved. A small frictional resistance is formed to enable the clutch to be smoothly manipulated, although there is a relatively small clutch depressing force by the driver, thereby preventing a separate generation of noise and vibration to obtain a silent and quiet operation.

Figure 3:
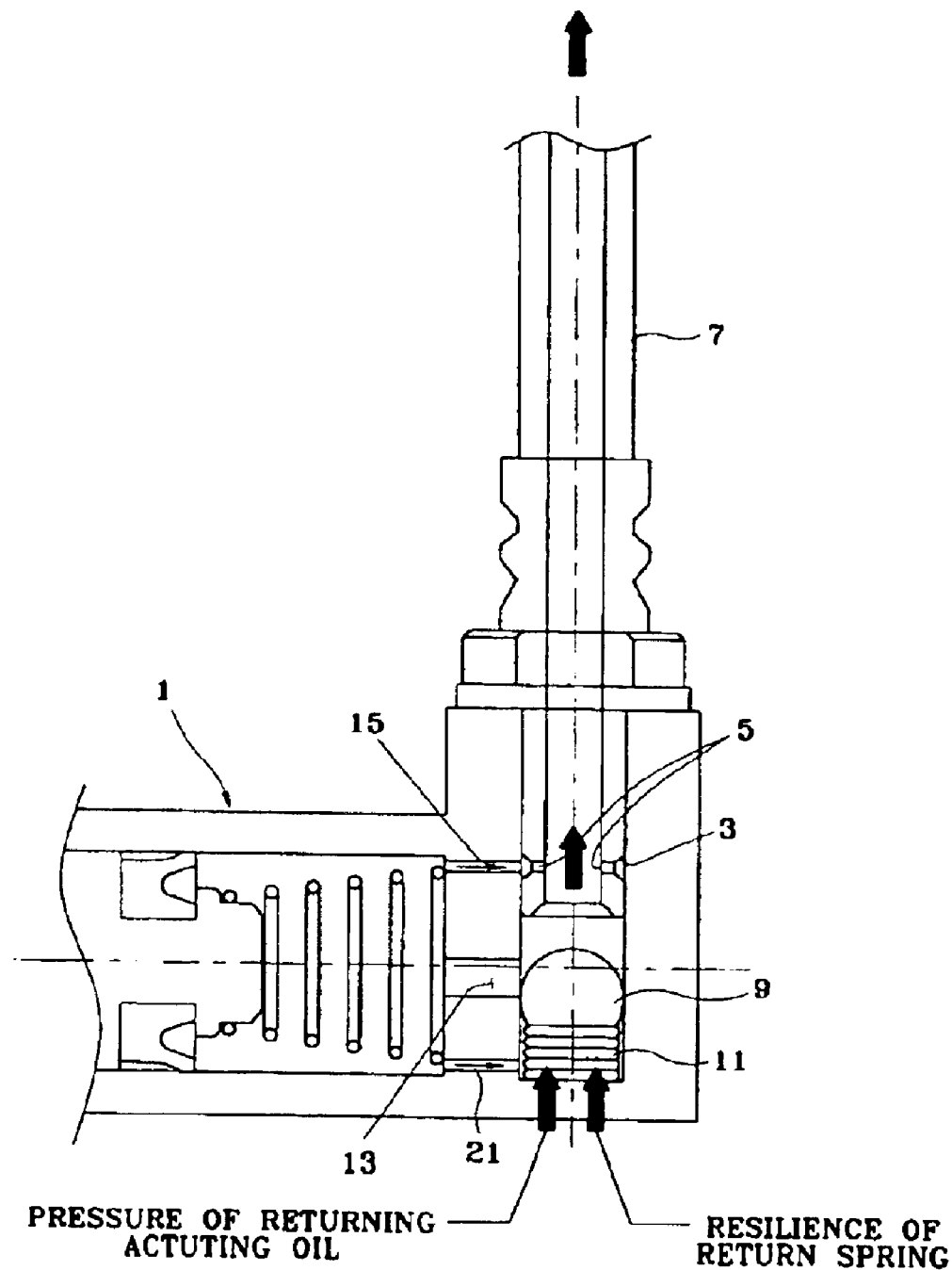
FIG. 3 is a schematic drawing for illustrating an operation of a choke valve when a clutch pedal is released.

Next, as illustrated in FIG. 3, when the pedal clutch is released, pressure is continuously supplied via the pressure adjusting hole 21 from the interior of the clutch release cylinder to a space at the return spring 11 side of the ball 9 where the same pressure as that of the clutch release cylinder 1 is formed through the pressure adjusting hole 21. The force of the return spring 11 is applied thereto to prompt the ball 9 to be swiftly moved to abut the spherical surface 19 of the hose 7.

Figure 4:
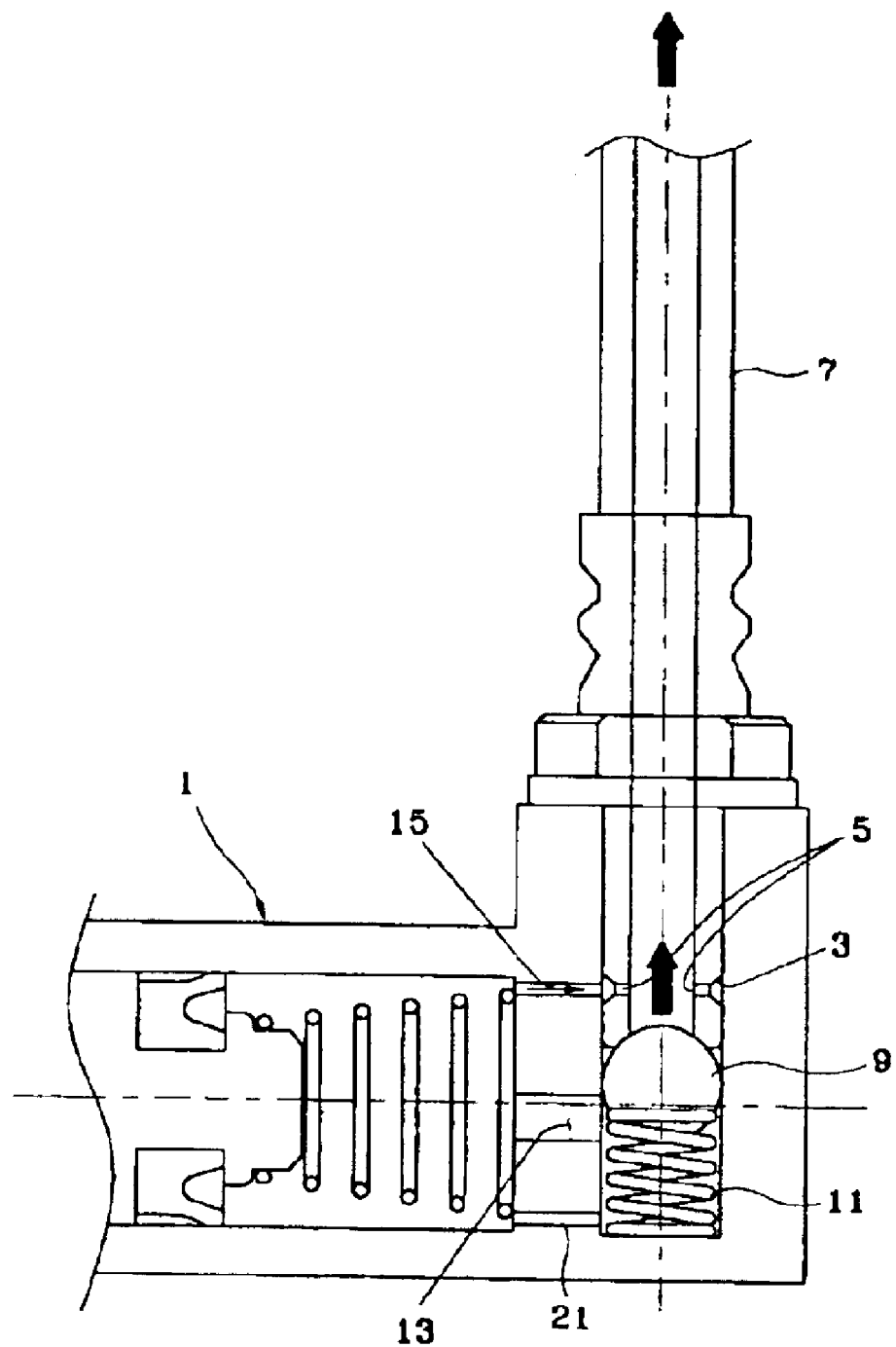
FIG. 4 is a schematic drawing for illustrating a state of actuating oil being discharged from a clutch release cylinder.

As illustrated in FIG. 4, a direct communication between the main hole 13 and the hose 7 is blocked by the ball 9, and the actuating oil filling the inside of the clutch release cylinder 1 is discharged into the hose 7 only through a route formed by the cylinder return hole 15, the return groove 3, and the hose return hole 5.

As a result, a quick discharge of the actuating oil is not realized, and instead, the actuating oil is slowly discharged, and the clutch slowly connects power with the engine to obtain smooth operation of the clutch.

As apparent from the foregoing, there is an advantage in the choke valve of the clutch release cylinder as described according to an embodiment of the present invention in that the actuating oil is slowly discharged when the clutch pedal is released. When the clutch pedal is depressed, resistance to the actuating oil is minimized for the actuating oil to be swiftly and smoothly supplied to the clutch release cylinder, thereby improving the responsiveness of the clutch and preventing occurrences of noise and vibration when the clutch is in operation.

The foregoing description of the preferred embodiment of the present invention has been presented for the purpose of illustration and description. It is not intended to be exhaustive or to limit the invention to the precise form disclosed, and modifications and variations are possible in the light of the above teachings or may be acquired from practice of the invention. It is intended that the scope of the invention be defined by the claims appended hereto and their equivalents.

What is claimed is:

1. A choke valve of a clutch release cylinder comprising:
   a hose connected to a clutch release cylinder for supplying actuating oil to said clutch release cylinder and formed at a circumferential surface thereof with a return groove for said actuating oil to flow and provided with a return hole for allowing said return groove to communicate with an interior of said hose;
   a ball resiliently supported at a distal end of said hose;
   a return spring for resiliently supporting said ball toward the distal end of said hose;
   a main hole formed at a wall of said clutch release cylinder to block communication with said hose by said ball abutted at the distal end of said hose; and
   a cylinder hole formed at said wall of said clutch release cylinder with a smaller diameter than that of said main hole so as to communicate with said return groove of said hose.

2. The choke valve as defined in claim 1, wherein a distal end of said hose is formed with a spherical surface for said ball to be tightly abutted thereto for a good seal.

3. The choke valve as defined in claim 1, wherein said wall of said clutch release cylinder is further formed with a pressure adjusting hole communicating with a space formed at a return spring side about said ball.

* * * * *